UNITED STATES PATENT OFFICE.

JEAN MARIE PERIGNY, OF LYON, FRANCE, ASSIGNOR TO GALLIA, SOCIÉTÉ ANONYME, OF GENEVA, SWITZERLAND.

MANUFACTURE OF CREAM OF TARTAR.

1,023,528.  Specification of Letters Patent.   Patented Apr. 16, 1912.

No Drawing.   Application filed November 14, 1911.  Serial No. 660,268.

*To all whom it may concern:*

Be it known that I, JEAN MARIE PERIGNY, a citizen of the Republic of France, residing at Lyon, France, have invented new and useful Improvements in the Manufacture of Cream of Tartar, of which the following is a specification.

This invention relates to a new process for the manufacture of cream of tartar from any crude material containing tartrates (argol, wine lees, crystals from wine lees and from stills, grape skins or the like) and is based on the variations of chemical equilibrium produced by variations of temperature in solutions of mixed salts. The end in view being to increase the solubility of bitartrate of potash in a hot liquor while keeping its solubility as low as possible in a cold liquor, experiments have proved that aluminium salts, and in particular the nitrate and the chlorid, give the best practical results. If, for example, bitartrate of potash is dissolved in a hot, chemically neutral solution of aluminium chlorid or nitrate, the tartrate dissolves at the boiling point in quantity corresponding with the acid of the salt and on cooling and stirring nearly the whole of the bitartrate is deposited. The same reaction occurs even at high concentrations, and about 120 parts of bitartrate can be dissolved in 100 parts of liquid. As to the calcium tartrate which always exists in more or less considerable proportion in the crude material, this also dissolves on boiling and it can be converted directly into cream of tartar in the liquor by adding the calculated proportion of an acid salt of potassium.

An exceedingly simple industrial application of this process is, for example, as follows:—Into a vat provided with a stirrer and a heating device, there are introduced one cubic meter of the saline solution containing 25 to 30 per cent. of chlorid of aluminum, and 1000 kilograms of the crude material, containing 75 per cent. of bitartrate, previously ground to the degree of fineness necessary for procuring rapid and complete solution. The mixture is heated to boiling for about an hour, is then decolorized by animal charcoal or any other suitable means, and is finally pumped into a filter press. The press-cake is washed with boiling water. The filtered liquor is run into stirring vats and allowed to cool to deposit crystals of bitartrate of potash, which are washed, dried and crushed. About 700 kilograms of cream of tartar are thus obtained. The cold mother liquor is returned to the process. The white cream of tartar obtained by this single process is always of a purity of 99 per cent. at least. When the crude materials contain notable quantities of sulfate of lime, it is useful to eliminate this by the addition of baryta in order to obtain pure cream of tartar. A great advantage of this process is that the salts of aluminium, being antiseptic, prevent any fermentation, even at the most favorable temperature.

With argol, crystals and other rich materials, it is easy to operate so as to obtain liquors containing 50 per cent. of bitartrate. With poorer materials, the abundance of residue necessitates a lower concentration, but the boiling liquor leaving the filter press may be used for a fresh extraction and need not be run into the crystallizing vats until it contains the desired proportion of cream of tartar dissolved in it. Finally, the other impurities, salts of iron, of lime, phosphoric acid and the like, which exist in small proportion in certain crude materials and tend to accumulate in the mother liquors, are precipitated from the latter from time to time by suitable reactions.

This new process includes the following principal advantages as compared with the old processes:—(1) high concentration, thus saving a notable amount of fuel, manual labor, power and material; (2) direct obtainment by a single solution and filtration of white and pure cream of tartar with very small cost for decolorizing; (3) suppression of all fermentation of the liquors at all seasons; (4) almost complete absence of mineral by-products, high yields and very small cost for liquids used for solution.

Having thus described the nature of this invention and the best means I know of carrying the same into practical effect, I claim:—

1. A process of manufacturing cream of tartar from crude material containing tartrates, which process consists in heating the crude material with a solution of a salt of aluminium, decolorizing the liquor, filtering it, crystallizing the cream of tartar out of the liquor by cooling it, and utilizing the liquor for a new operation.

2. A process of manufacturing cream of tartar from crude material containing tartrates, which process consists in heating the crude material with a solution of an aluminium chlorid, decolorizing the liquor, filtering it, crystallizing the cream of tartar out of the liquor by cooling it, and finally using the liquor for a new operation.

In testimony whereof I have signed my name to this specification in the presence of two subscribing witnesses.

JEAN MARIE PERIGNY.

Witnesses:
 ALBERT VIARDOT,
 PHILIPPE VIENOS.